No. 874,233. PATENTED DEC. 17, 1907.
W. W. PARSONS.
MECHANISM FOR LOCKING SPLIT BOLTS.
APPLICATION FILED OCT. 3, 1907.
3 SHEETS—SHEET 1.
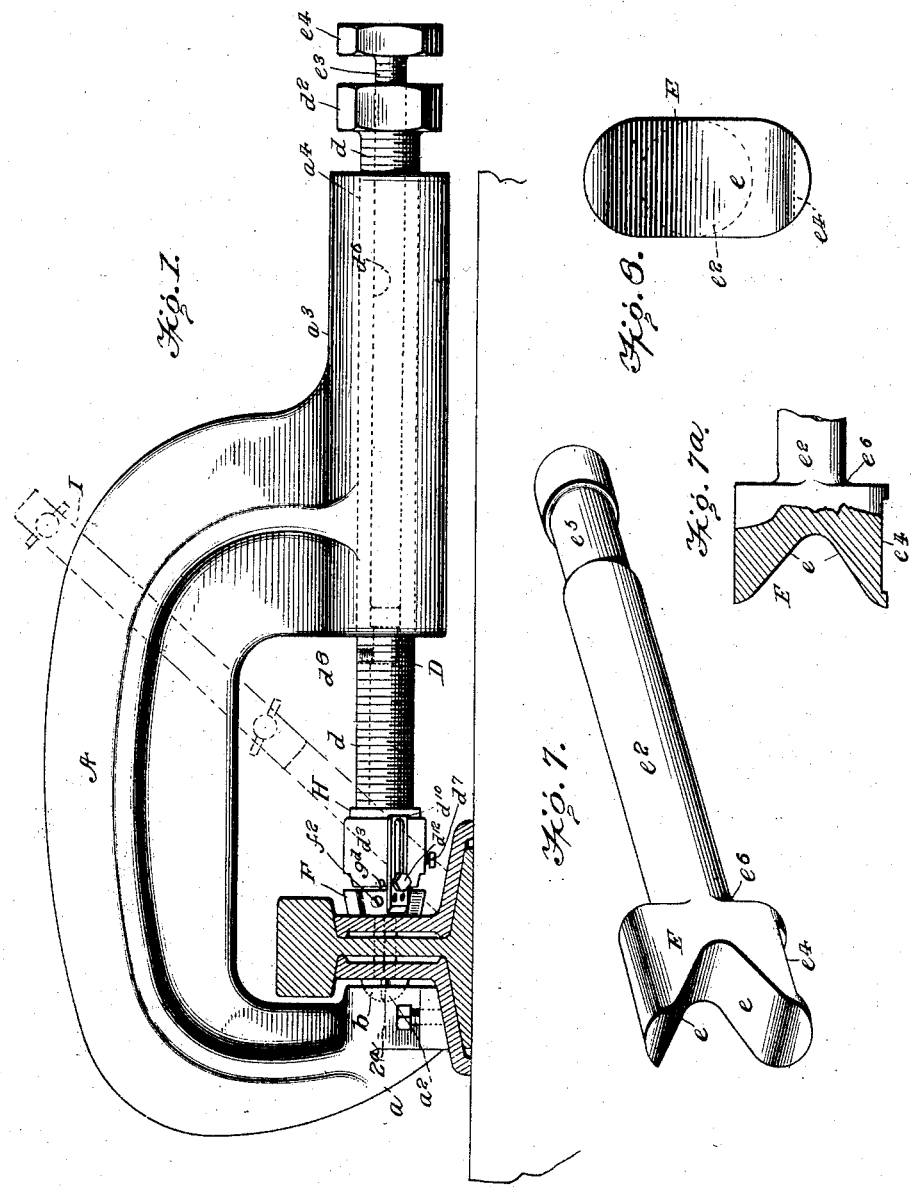

No. 874,233. PATENTED DEC. 17, 1907.
W. W. PARSONS.
MECHANISM FOR LOCKING SPLIT BOLTS.
APPLICATION FILED OCT. 3, 1907.
3 SHEETS—SHEET 2.
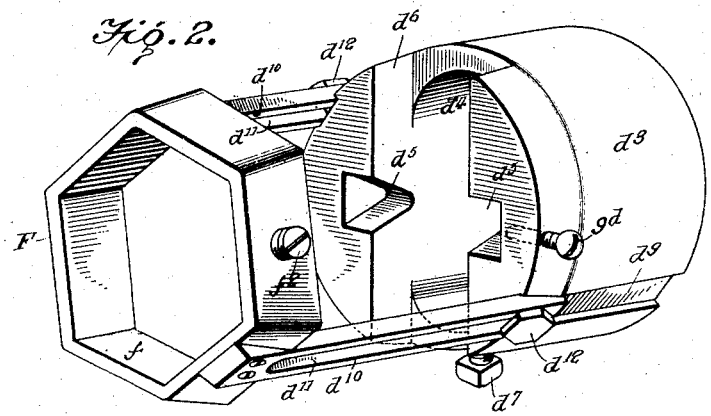
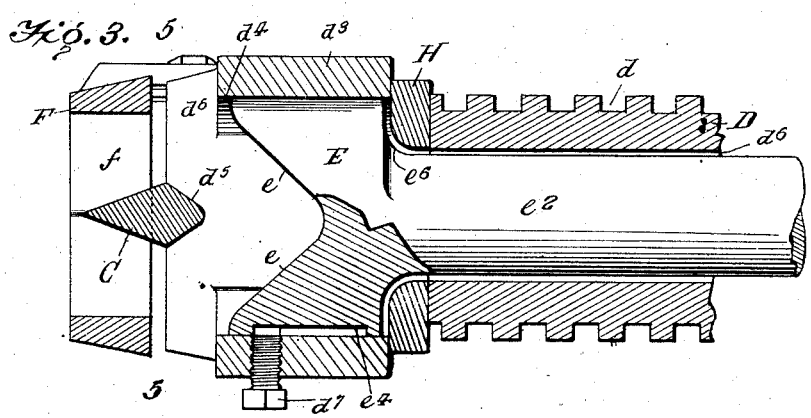
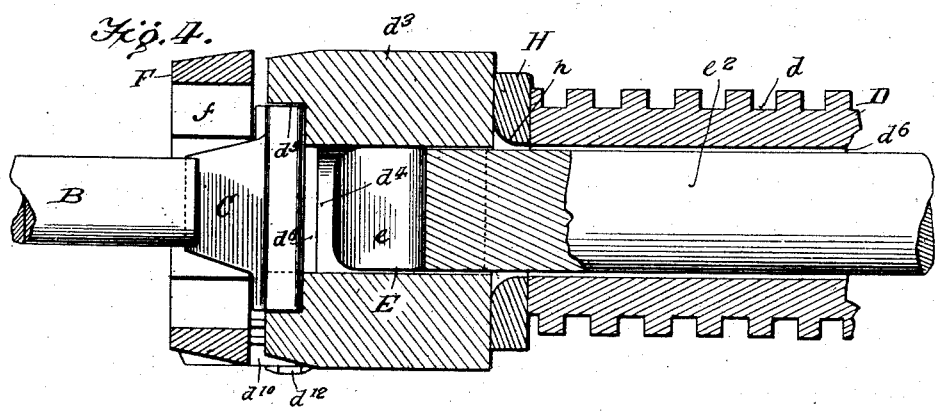
WITNESSES:
INVENTOR:
Wallace W. Parsons,
by
HIS ATTORNEY.

No. 874,233. PATENTED DEC. 17, 1907.
W. W. PARSONS.
MECHANISM FOR LOCKING SPLIT BOLTS.
APPLICATION FILED OCT. 3, 1907.
3 SHEETS—SHEET 3.
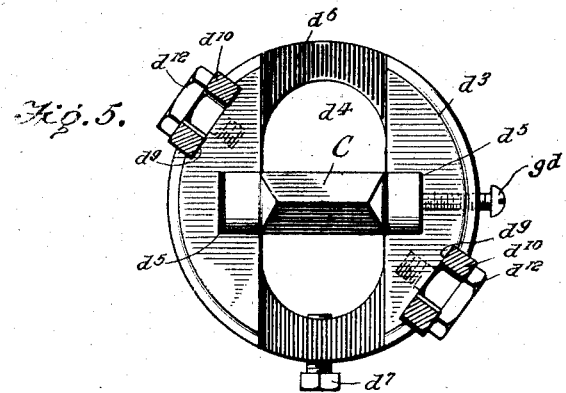
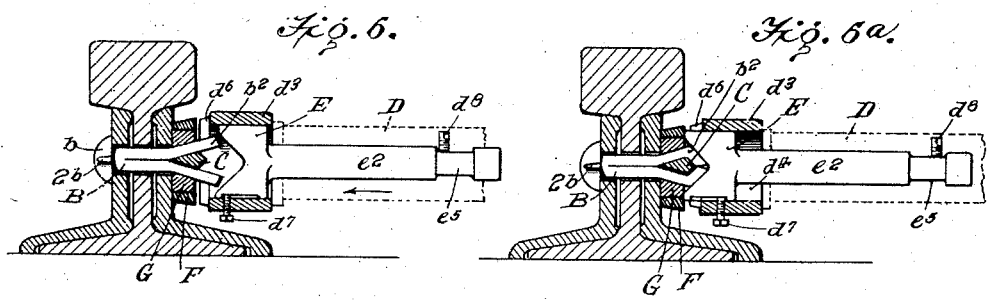
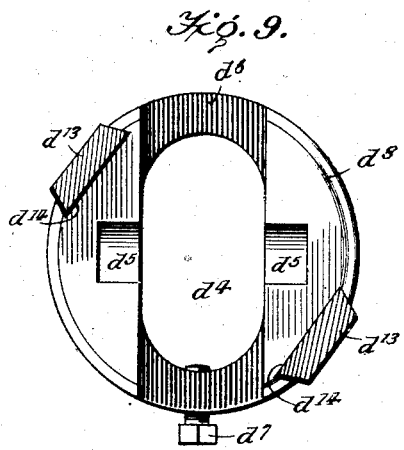
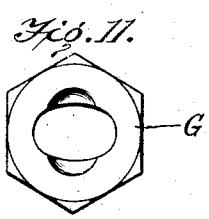

UNITED STATES PATENT OFFICE.

WALLACE WILLIARD PARSONS, OF MOUNT RAINIER, MARYLAND.

MECHANISM FOR LOCKING SPLIT BOLTS.

No. 874,233.　　　　Specification of Letters Patent.　　　　Patented Dec. 17, 1907.

Application filed October 3, 1907. Serial No. 395,754.

*To all whom it may concern:*

Be it known that I, WALLACE WILLIARD PARSONS, a citizen of the United States, residing at Mount Rainier, in the county of Prince George and State of Maryland, have invented certain new and useful Improvements in Mechanism for Locking Split Bolts; and I do hereby declare the following to be a full, clear, and exact description of the invention, such as will enable others skilled in the art to which it appertains to make and use the same.

This invention relates to mechanism for locking split bolts.

The object is to provide mechanism which shall, in the first place, be compact in form; in the second place, be easily and rapidly manipulated; and, in the third place, be inexpensive in its production.

In an application for Letters-Patent, heretofore filed by me; to wit, on the 8th day of December, 1906, Serial No. 346,942, I have disclosed a form of mechanism for a purpose, in part, similar to that to which the present invention pertains; but, as a result of extended and varied operation thereof, I have found that it possesses disadvantages which it is the object of the present invention to overcome, such disadvantages arising from the form of the bending or swaging-tool constituting a part of said mechanism, and from the necessity for the operator to handle and hold certain of the parts. In my earlier construction, the said bending or swaging-tool resides in a member which has a body-portion provided, in its outward or operative face, with a cavity or depression formed with walls which are concaved, so that, in cross-section, the cavity is elliptical. The production of a tool with this form of cavity entails great care and expense, because the walls of said cavity have necessarily to be machined with skill and accuracy and with a specially-arranged machine. I find, now, that this can be avoided, and that a swaging-tool can be produced to perform all the functions required of a tool used in this connection without having a cavity therein in the form of an ellipse.

My present invention is, therefore, characterized by a swaging-tool formed with an approximately V-shaped depression, without end walls or faces, but with unbroken flat-faced walls which will, near their outer ends, first engage the outspread members of a split-bolt and, while said swaging-tool is being pressed against said bolt members, tend to force their ends toward each other to embrace a locking wedge or key previously positioned (by parts of my device herein disclosed) between the separated bolt-members; the key being, preferably, positioned, and maintained in position, by a wedge-engaging member, also constituting a useful part of my device, though one which may, if desired, be dispensed with.

My invention comprises, furthermore, for a nut, washer or bolt-locking-element, a positioning and holding-member coöperatively arranged with relation to the wedge-engaging-member and the swaging-tool.

My invention comprises, furthermore, means for operating, guiding, positioning, and holding the various parts.

My invention resides, finally, in the novel construction, combination, and arrangement of parts, and in the details thereof, fully hereinafter described and illustrated in the accompanying drawings.

In said drawings forming a part of this specification and in which like characters of reference indicate corresponding parts, I have illustrated one of many embodiments of my invention, it being understood that certain modifications thereof would naturally be within the spirit of my invention.

Figure 1 is a view in elevation of my invention arranged for locking a bolt in a railway track; Fig. 2 is a view in perspective of the general operating-parts, detached from the supporting-jack, and showing the shiftable nut-positioning member in its shifted position; Fig. 3 is a view in horizontal section taken through the middle line of the shaft in Fig. 4; Fig. 4 is a view in vertical section taken centrally through the shank $e^2$, Fig. 3; Fig. 5 is a view in end elevation of the wedge-engaging member; Fig. 6 is a view in longitudinal section, showing the parts in the position they occupy just prior to the operation of the swaging-tool; Fig. 6$^a$ is a similar view, the parts appearing in the positions they occupy after the operation of the swaging-tool; Fig. 7 is an enlarged detail view, in perspective, of the swaging-tool (detached from its support), showing more clearly its bolt-bending depression; Fig. 7$^a$ is a detail view, partly broken away to show the general contour of the walls of said depression; Fig. 8 is an end elevation thereof; Fig. 9 is a view, in end elevation, of a modified form of a wedge-engaging member; Fig. 10 is a view of a modification of the swaging-tool; and Fig. 11 is a view of the nut or washer.

In these drawings, A designates a jack, clamp, jaw or member, formed to present an arm $a$ provided in its inner face with a small cavity or depression $a^2$ in which the head $b$ of the bolt B is to be seated while the separated ends $b^2$, $b^2$ of the bolt are being bent toward each other, and upon the spreading and locking-wedge or key C. Said cavity may, if desired, be provided with a shallow slot $2^a$ to receive a rib $2^b$ on the head of the bolt, whereby the bolt may hold against turning. The opposite end of said jack is formed with a cylindrical supporting-portion $a^3$ internally screw-threaded, as at $a^4$. Threaded into, and thus rotatably supported by, said portion $a^3$, is an elongated, revoluble screw member or sleeve D preferably screw-threaded externally, as at $d$, and provided, at one end, with a square head $d^2$, and carrying at its opposite end, a wedge-engaging annulus or collar $d^3$ preferably larger in its diameter than the threaded shank of the sleeve D and having, centrally an elliptical bore $d^4$ which, at its outer edge, is formed with V-shaped sockets or incuts $d^5$ and designed to engage one portion of the wedge C. In the outer face of said annulus or collar, I also may provide an incut $d^6$ (preferably extending from the periphery, and at right angles to the V-shaped incut $d^5$ of the collar). This provides a channel or way to the center of the collar to enable sight of the key C when being placed in position. It is to be understood that, when the sleeve D is turned, as by a wrench operated on the head $d^2$, it will have a longitudinal and axial movement toward the end of the bolt B (which, when inserted into the holes through the fish-plates and rail, has its split-members together) and the annulus will engage and force the locking-wedge between said bolt-members to separate them, as illustrated in Fig. 6. This member D, with its annulus or collar $d^3$, constitutes a wedge-positioning and holding-device, in that it first positions the wedge between the members of the split-bolt to spread them, and then holds said wedge firmly in position during the subsequent operation of forcing the ends of the bolt-members against and over the wedge.

Housed, and rotatably and slidingly supported within the collar $d^3$, is the bending or swaging-tool E comprising a body-portion, preferably of greater height than width and of a diameter slightly less than the bore $d^4$ and designed to be movably supported by the walls thereof. In one end of this body-portion is a depression formed by the inclined, inwardly-extending walls $e$, $e$. From the opposite portion of this bending tool extends a stem or shank $e^2$, designed freely to turn in the bore $d^4$ which extends through the sleeve D from the collar $d^3$ to the head $d^2$. Also rotatably supported in said bore $d^4$ and extending through and beyond the head $d^2$ is a screw-threaded shaft $e^3$ having a square head $e^4$ provided on its outer-end, just beyond the head $d^2$ of the sleeve D. When the shank $e^3$ is turned by the wrench operating on the head $e^4$, it will move the shank $e^2$ and thus the bending-tool E forward, first to engage the ends of the members of the bolt (which have been spread apart by the spreading and locking-wedge C being forced between them), and, then, as said ends slide along the inner walls $e$ of the depression in the bending-tool, they are forced toward each other until they rigidly embrace the wedge or key C, as shown in Fig. 6$^a$. During this operation, the wedge-engaging member D has served to hold said key firmly in place.

In Fig. 10, I have shown the walls $e$, $e$, of the tool provided with a channel or groove $e^5$ which will, if necessary, serve to guide the ends of the bolt-members as they slide along the walls of the tool's depression when being forced together. It will be understood that the sleeve D serves two functions; namely, first, to position its wedge-engaging member $d^3$, and, secondly, to support and, to an extent (during its longitudinal movement), to position the bending-tool E. It is to be understood, of course, that, instead of being screw-threaded, as at $d$, said sleeve D may be provided with any other means for effecting its longitudinal movement within the portion $a^3$, or the screw-threads may be omitted altogether, thus to permit said sleeve to slide freely. Likewise, the shaft $e^3$ may be provided with means other than screw-threads to give it a longitudinal thrust; or the screw-threads may be omitted altogether, in which event, the bending-tool could be forced against the bolt-members to bend them, by the blow of a sledge or hammer, or by a cam or eccentric, or any other like device. Because of the fact that the wedge-engaging member is, at the time, holding the key and nut or washer firmly in position, any blow or jar will have no tendency to loosen the bolt, as the strain is not taken off until the points of the bolts are firmly closed over the key. Extending through the wall of the collar $d^3$ is a short screw $d^7$ which engages in a slight depression $e^4$ in the periphery of the swaging-tool E. This screw is to enable the swaging-tool to be retained or rigidly held in position in the collar $b^3$, as, for instance, while the wedge or other parts are being adjusted or positioned. As an additional retaining device, I may provide a screw $d^8$ to extend through the screw-threaded portion of the wedge-engaging member and work in an annular groove $e^5$ in the stem or shank $e^2$ (Fig. 7) of the swaging-tool E. To hold the wedge in position, I may provide an adjusting screw $9^d$ which passes through the wall of the collar $d^3$ and into one of the incuts $d^5$, and engages the edge of the wedge. On the outside of the collar $d^3$, and at points opposite each other, are two guide-ways $d^9$, $d^9$, in each of which is guided a slide $d^{10}$, which may be slotted, as at $d^{11}$ to receive a screw or headed pin $d^{12}$ extending into the portion $d^3$. In lieu of the arrangement herein, I may dove-tail the slides, as $d^{13}$, $d^{13}$, and make the guide-ways $d^{14}$, $d^{14}$ to conform thereto (Fig. 9); in which event, it would not be necessary to employ the headed element $d^{12}$.

The slides are secured at their outer ends to a nut-engaging member F for supporting and positioning a nut or washer G. This member F has, preferably, a hexagonal bore $f$, in which the nut G is supported. A screw $f^2$ extends through the shell or core of the member, and, when turned to engage the washer G, serves to hold it within the member while being positioned over the end of the split-bolt and up against the fish-plates.

Encircling the stem of the swaging-tool and disposed to the rear of the collar of the wedge-engaging member is a loose collar H, one face $h$ of which is cut away towards its inner periphery to take over the enlarged portion $e^6$ of the stem or shank $e^2$ of the swaging-tool.

To maintain the jack A in its upright position, when in operation, I connect thereto a support or supports, I, which may be adjusted with relation to the jack or to each other.

It is obvious that the bending or swaging-tool E may be cast in the form shown, or the V-shaped depression may be easily cut therein without the expense or care required in forming the elliptical cavity in the swaging-tool of the device of my other application, hereinbefore mentioned.

By the combination of the nut-positioning member, the wedge-engaging member, and the swaging-tool, in the one device, I present a structure which is always kept intact, is easily and conveniently manipulated, and is absolutely certain in its operation.

Having thus described my invention, what I claim and desire to procure by Letters-Patent is:

1. In a device for locking split-bolts, the combination with a jack provided with a supporting portion, a slidable member movably supported by said portion, a key-engaging member carried by said slidable-member, and a bending-tool supported and positioned by said slidable-member and provided with a depression formed with flat-faced walls which incline toward each other.

2. In a device for locking split-bolts, the combination with a jack provided with a supporting-portion, and a head-engaging arm, a slidable-member movably supported by said supporting-portion, a key-engaging-member carried by said slidable-member, and a bending-tool supported and positioned by said slidable-member and provided with a depression formed with flat-faced walls which incline toward each other.

3. In a device for locking split-bolts, the combination with a jack provided with a supporting-portion, a slidable-member movably supported by said portion, a key-engaging-member carried by said slidable-member, and a bending-tool supported and positioned by said slidable-member and provided with a depression formed with flat-face walls which incline toward each other, and additional means for supporting said jack.

4. In a device for locking split-bolts, a jack, jaw, or body, having arms or portions projecting therefrom, a bolt-bending or swaging-tool supported in one of said arms and provided, at one end, with a depression having converging, flat-surfaced walls.

5. In a device for locking split-bolts, a jack, jaw, or body, having arms or portions projecting therefrom, a longitudinally and axially movable bolt-bending or swaging-tool supported in one of said arms, and provided at one end with a depression having converging flat-surfaced walls.

6. In a device for locking split-bolts, a jack, jaw, or body, having arms or portions projecting therefrom, a bolt-bending or swaging-tool supported in one of said arms and provided at one end with a depression having converging flat-surfaced walls, and means for engaging, positioning, and holding a wedge.

7. In a device for locking split-bolts, a jack, jaw, or body, having arms or portions projecting therefrom, a bolt-bending or swaging-tool detachably supported in one of said arms, and provided at one end with a depression having converging flat-surfaced walls.

8. In a device for locking split-bolts, a jack, jaw, or body, having arms or portions projecting therefrom, a bolt-bending or swaging-tool supported in one of said arms, and provided at one end with a depression having converging flat-surfaced walls, and means for applying pressure to the swaging-tool.

9. In a device for locking split-bolts, a supporting-member, a wedge-engaging member, a nut-positioning-member, and a swaging-tool.

10. In a device for locking split-bolts, a supporting-member, a slidable wedge-engaging-member, a nut-positioning-member, and a swaging-tool.

11. In a device for locking split-bolts, a supporting-member, a slidable and rotatable wedge-engaging-member, a nut-positioning-member, and a swaging-tool.

12. In a device for locking split-bolts, a nut-positioning member, a wedge-engaging member, slidingly coöperating therewith, and a swaging-tool operatively associated with said wedge-engaging member.

13. In a device for locking split-bolts, a nut-positioning member, a wedge-engaging member, and a swaging-tool carried and movable within said wedge-engaging member.

14. In a device for locking split-bolts, a nut-positioning member, a wedge-engaging member connected and relatively movable thereto, and a swaging-tool operatively associated with said wedge-engaging member.

15. In a device for locking split-bolts, a nut-positioning member, means for securing a nut or the like in said nut-positioning member, a wedge-engaging member, and a swaging tool operatively associated therewith.

16. In a device for locking split-bolts, a nut-positioning member, a wedge-engaging member, a swaging-tool operatively associated with said wedge engaging member, and means for securing said swaging tool relatively thereto.

17. In a device for locking split-bolts, a nut-positioning member, a wedge-engaging member, means for securing a wedge therein, and a swaging tool operatively associated therewith.

18. In a device for locking split-bolts, a nut-positioning member, means for securing a nut or the like therein, a wedge-engaging member, means for securing a wedge therein, a swaging-tool operatively associated with said wedge-engaging member, and means for securing said swaging-tool relatively thereto.

19. In a device for locking split-bolts, a nut-positioning member, a wedge-engaging member, means for advancing said wedge-engaging member relatively to the nut positioning member, and a swaging-tool carried by said wedge-engaging member and operatively associated therewith.

20. In a device for locking split-bolts, a nut-positioning member, a wedge-engaging member, slides carried by one of said members and movably connected with the other, and a swaging-tool operatively associated with said wedge engaging member.

21. In a device for locking split-bolts, a nut-positioning member, a wedge-engaging member, and a swaging or bending tool having a depression formed with flat faced walls inclining toward each other, said walls being provided with means for guiding the ends of the split bolt in its movement along said walls.

22. In a device for locking split bolts, a nut positioning member, a wedge engaging member, a swaging tool, and means for effecting pressure upon the swaging tool.

23. In a device for locking split bolts, a nut positioning member, a wedge engaging member, a swaging tool, and means for effecting longitudinal movement of the swaging-tool.

24. In a device for locking split bolts, a nut positioning member, a movable wedge-engaging member, a swaging tool, and means for effecting movement of the swaging tool in unison with and independently of the movement of the wedge engaging member.

25. In a device for locking split bolts, the combination with a jack provided with a supporting portion, a movable member having threaded engagement therewith, a key engaging member carried by said movable member, and a bending tool having threaded engagement with said movable member.

26. In a device for locking split bolts, the combination with a jack provided with a supporting portion, a movable member having threaded engagement therewith, a key engaging member carried by said movable member, a bending tool having threaded engagement with said movable member, and screw securing means for holding said bending tool.

27. In a device for locking split bolts, the combination with a jack provided with a supporting portion, an internally and externally threaded member supported thereby, and carrying a key engaging member, and a bending tool movably supported by said threaded member.

28. In a device for locking split bolts, the combination with a supporting portion, of a hollow member slidably and rotatably supported thereby, of a key engaging member carried by said hollow member, screw securing means for positioning a key in said key engaging member, and a bending tool movable within said hollow member.

29. In a device for locking split bolts, the combination with a jack, jaw or body, of arms projecting therefrom, of a cavity or depression in the inner face of one of said arms, of an additional supporting member carried by the other of said arms, of a threaded member, and a bending tool movable within said threaded member.

30. In a device for locking split bolts, the combination with a supporting member of a slidable member operatively associated therewith, of a key engaging member, screw securing means for positioning a key, of a nut supporting member, screw holding means for positioning a nut, and a bending tool relatively movable therewith.

In testimony whereof, I affix my signature, in the presence of two subscribing witnesses.

WALLACE WILLIARD PARSONS.

Witnesses:
E. H. PARKINS,
EDMUND H. PARRY.